P. M. PAYNE.
THROTTLE CONTROL MECHANISM.
APPLICATION FILED NOV. 6, 1920.
1,429,528.
Patented Sept. 19, 1922.
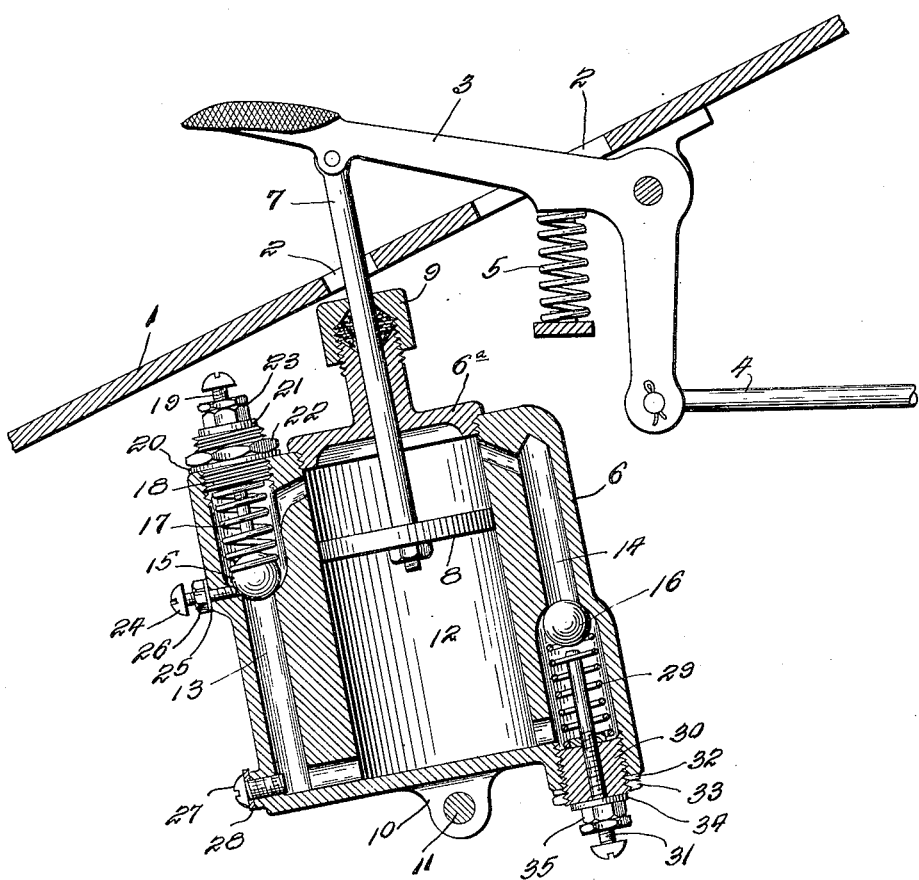

Patented Sept. 19, 1922.

1,429,528

UNITED STATES PATENT OFFICE.

PEARSON M. PAYNE, OF PITTSBURGH, PENNSYLVANIA.

THROTTLE-CONTROL MECHANISM.

Application filed November 6, 1920. Serial No. 422,349.

*To all whom it may concern:*

Be it known that I, PEARSON M. PAYNE, a citizen of the United States, residing at Pittsburgh, in the county of Allegheny and State of Pennsylvania, have invented certain new and useful Improvements in Throttle-Control Mechanisms, of which the following is a specification.

My invention relates to improved means for controlling the operation of the throttle of engines, and is especially applicable to the control of the throttle of an automobile engine.

The present type of automobile throttle control is operated by a foot pedal known as an "accelerator," which is connected by suitable cranks and links to the throttle, which is usually placed immediately above the carburetor. The pedal is conveniently located on the automobile foot board for operation by foot. A spring is usually attached to the pedal mechanism so that it will lift the pedal and close the throttle automatically when the foot pressure is removed from the pedal. When the driver of an automobile applies foot pressure to the pedal to hold it in an intermediate position, he meets with the difficulty of holding it constantly in one position, due to the jolting of the car, which tends to cause his foot to vibrate the pedal, thus intermittently applying the gas to the engine, so that the car and its mechanism are constantly subjected to power shocks, which are in turn transmitted to the chauffeur, whose foot rests on the accelerator, still further intensifying the undesirable fluctuation in throttle movement. In other words, the throttle under the same conditions of driving is suddenly moved by vibration repeatedly from full closed to full open position, against the will of the operator, giving rise to a very uneven power output of the motor, and causing jumping or lunging of the car, throwing severe strains on the car mechanism and tiring out the operator.

Furthermore, the undesirable movements of the throttle cause a waste of gasoline and extra wear and tear of the motor and the entire mechanism.

I am familiar with the efforts which have been made to remedy this defect by applying a simple dash pot to the accelerator, but when the dash pot is made "stiff" or "slow" enough in its motion to reduce the undesirable movements of the throttle pedal, it is then so "stiff" that the operator cannot under some conditions when it is desirable open the throttle fast enough to accelerate the car as desired, nor can he close the throttle as fast as it is sometimes necessary to avoid accidents, running into rough roads, or similar places.

Among the objects of this invention is the construction of an escapement by-pass with adjustable quick motion in both directions, so that the by-pass can be adjusted stiff enough to prevent the ordinary vibrations or undesirable movements of the throttle, due to rough roads and other causes, and at the same time the by-pass is so adjusted that when more than ordinary force is applied in either direction the valves then open to allow the quick movement such as may be desirable for quick acceleration or deceleration.

Further objects of my invention are the prevention of the waste of gas by means of mechanism to regulate the action of the throttle control, the prevention of injury to the automobile mechanism from sudden starts and stops, and the construction of a throttle control which will not tire the operator of the automobile in using it.

With these and other objects in mind, one embodiment of my invention is shown in the accompanying drawing, which is a vertical sectional view of my valve, with some parts of the mechanism shown in elevation.

As shown by the drawings, the floor 1 of an automobile may have suitable openings 2 in it for a foot pedal 3 connected with the throttle control rod 4 which is kept in a normally closed position by coil spring 5.

A dash pot 6 the upper part 6$^a$ of which is removable is pivotally attached to the pedal by means of a piston rod 7 having a head 8 thereon. This rod may have a packing nut 9 connected with the dash pot by screw threads. The dash pot may be pivotally attached to the frame of the automobile by means of an extension 10 having an opening therein for a bolt 11. The cavities in the dash pot may be filled with oil or other suitable fluid, for a purpose to be pointed out.

The main chamber 12 is connected at the top and bottom by two by-passes 13 and 14, in both of which are spring-controlled valves 15 and 16. Valve 15 has a spring 17 to force the valve to its seat. The tension of this spring is adjusted by a plug 18. The maximum lift of the valve 15 is adjusted by a screw 19. The plug 18 may have a fluid retaining washer 20 thereon and there may also be a second fluid retaining washer 21 on the screw 19. There may be nut locks 22 on plug 18 and also a nut lock 23 on screw 19. The seating of the valve 15 is controlled by a screw 24, having a fluid retaining washer 25 and a nut lock 26.

The tension of the spring 29 is regulated by a plug 30 and the maximum unseating of valve 16 is controlled by screw 31. Plug 30 has a fluid retaining washer 32 and a nut lock 33. Screw 31 has also a fluid retaining washer 34 and a nut lock 35.

The operation of my device is as follows:

If the throttle is in a closed position and pressure is applied to the foot pedal, the throttle can be opened to any desired degree but is prevented from opening too fast by the fluid under the piston which is forced through by-pass 13 under the valve 15 and from there back into the space above the piston.

The speed with which the throttle is opened may be regulated by the screw 24, plug 18 and screw 19. Should quick acceleration be desired enough downward force on the accelerated pedal would raise the valve 15, allowing the throttle to open quickly.

On the return stroke of the piston, that is, when the throttle is being closed, the fluid flows from the upper part of the cylinder under valve 15 toward the lower part of the cylinder and also over valve 16, pressing it down. The closing speed of the throttle can be adjusted by plug 30, screw 31 and screw 24.

The exact location of the dash pot is not important, and the general construction, size and arrangement of the parts may be changed without departing from the spirit of my invention.

I claim—

1. A dash pot capable of containing fluid, said pot having a central opening, said pot having by-passes, said passes having valves therein, said valves being spring controlled, means to vary the force of said springs, and means to fix the maximum opening of said valves.

2. A device of the kind described, said device having a main chamber therein, and said chamber having by-pass connections between the upper and lower parts thereof, valves in said by-passes, said valves being spring controlled, means to adjust the tension of said springs, adjustable means in each by-pass to regulate the unseating of said valve, said means being adapted in one by-pass to prevent the seating of said valve.

In testimony whereof I affix my signature.

PEARSON M. PAYNE.